United States Patent [19]
Curtis et al.

[11] Patent Number: 5,471,106
[45] Date of Patent: Nov. 28, 1995

[54] METHODS AND APPARATUS FOR CLOSED-LOOP CONTROL OF MAGNETIC BEARINGS

[75] Inventors: Alan R. D. Curtis, Phoenix; James E. Joseph, Mesa, both of Ariz.

[73] Assignee: Noise Cancellation Technologies, Inc., Linthicum, Md.

[21] Appl. No.: 233,538

[22] Filed: Apr. 26, 1994

Related U.S. Application Data

[63] Continuation of Ser. No. 27,739, Mar. 8, 1993, abandoned.
[51] Int. Cl.$^6$ .................................................. H02K 7/09
[52] U.S. Cl. ................. 310/90.5; 310/68 B; 324/207.25; 324/207.26
[58] Field of Search ................... 310/90.5, 68 B; 318/629, 632; 324/207.25, 207.26; 361/144

[56] References Cited

U.S. PATENT DOCUMENTS

| | | | |
|---|---|---|---|
| 4,490,841 | 12/1984 | Chaplin | 381/71 |
| 4,642,501 | 2/1987 | Kral et al. | 310/90.5 |
| 4,652,820 | 3/1987 | Maresca | 310/90.5 |
| 4,841,184 | 6/1989 | Chen et al. | 310/90.5 |
| 4,841,212 | 6/1989 | Matushita et al. | 310/90.5 |
| 4,920,290 | 4/1990 | Murakami et al. | 310/90.5 |
| 4,947,435 | 8/1990 | Taylor | 381/71 |
| 5,093,754 | 3/1992 | Kawashima | 361/144 |
| 5,202,824 | 4/1993 | Chen | 310/90.5 |
| 5,247,219 | 9/1993 | Nakagawa et al. | 310/90.5 |

*Primary Examiner*—R. Skudy
*Attorney, Agent, or Firm*—James W. Hiney

[57] ABSTRACT

A magnetic bearing control system for a rotating shaft, for example, includes a plurality of electromagnets disposed around and in close proximity to the surface of the shaft. The control system provides a bias current to the electromagnets to maintain the shaft in a null position. Levitation of the shaft is controlled by a levitation controller, and disturbance rejection is effected by a disturbance rejection controller. Flux sensors, suitably located near the electromagnets, determine the magnitude and polarity of the flux resident in the gap between each electromagnet and the shaft. The controller determines the size of the gap based on the flux and generates a corresponding control signal to maintain the position of the shaft within the bearing.

39 Claims, 11 Drawing Sheets

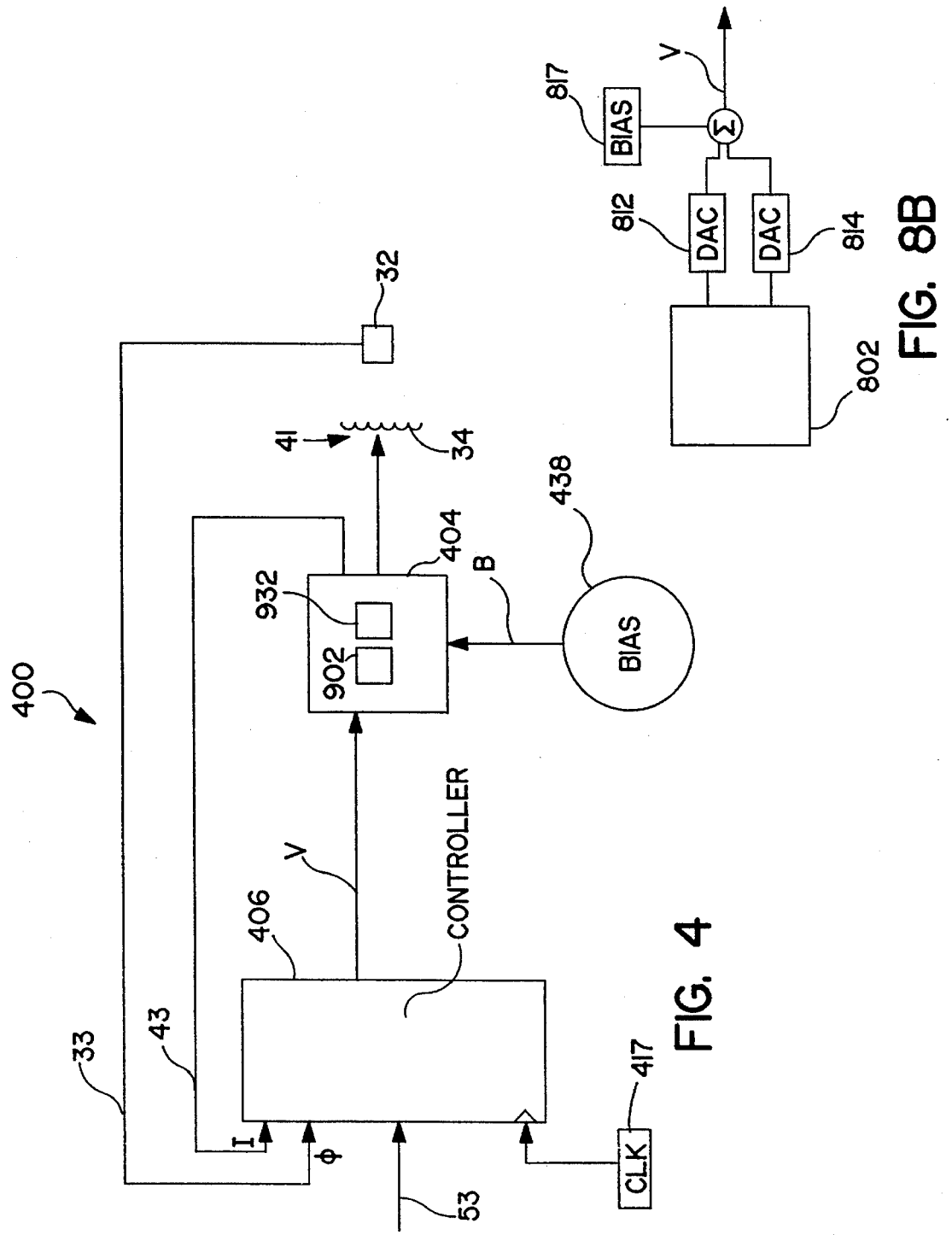

METHODS AND APPARATUS FOR CLOSED-LOOP CONTROL OF MAGNETIC BEARINGS

This is a continuation of application Ser. No. 08/027,739 filed Mar. 8, 1993, abandoned.

TECHNICAL FIELD

The present invention relates, generally, to magnetic bearings for supporting rotating shafts, and more particularly to closed-loop levitation control systems for such bearings using magnetic flux as a control feedback parameter, in combination with disturbance rejection circuitry.

BACKGROUND OF THE INVENTION

Magnetic bearings are increasingly used in lieu of conventional contact bearings in applications in which lubrication or maintenance of conventional bearings is impractical or otherwise problematic. Since a magnetic bearing supports a rotating shaft by suspending the shaft in a magnetic field, contact between the shaft and the bearing is eliminated during normal operation. In the absence of friction between the shaft and the bearing, bearing and shaft wear is virtually eliminated, effectively extending the life of the bearings well beyond that associated with conventional friction bearings.

Moreover, conventional friction bearings often generate large amounts of heat and/or sparks, particularly in high speed and high output load applications. In applications involving volatile fluids, for example in pumps used in the petro-chemical industry, the use of magnetic bearings greatly reduces the potential for accidental fires and explosions.

Magnetic bearings are particularly useful where access to the bearings is limited, for example in high pressure applications where the shaft and the motor which drives the shaft are enclosed within a sealed chamber. In view of the difficulties associated with disassembling the pump in order to gain access to the bearings, the use of magnetic bearings is highly desirable.

Presently known magnetic bearing systems comprise a plurality of bearings, each having a pair of electromagnets disposed opposite one another, with the rotating shaft interposed therebetween. Each electromagnet includes a magnetic core and a coil wrapped around the core. When voltage is applied across the coil, the current running through the coil induces a magnetic field in the coil which extends beyond the coil and attracts the shaft to the electromagnet. By disposing the electromagnets opposite one another, controlled application of predetermined voltages to the respective electromagnets generates corresponding flux levels at the shaft which tend to urge the shaft along a line extending between the electromagnets in accordance with the applied voltage. Consequently, when the shaft deviates from a desired nominal position between the electromagnets, the voltage at the electromagnetic coils may be varied to create an opposing force on the shaft and thereby return the shaft to its desired position. Moreover, by disposing a plurality of such bearings about the shaft, all degrees of shaft motion may be effectively controlled.

The use of magnetic bearings in the foregoing manner to control the position of a shaft is referred to as levitation. In order to effectively employ magnetic bearings to levitate a shaft, it is necessary that the shaft comprise a ferrous material, e.g. a ferric material, such that the shaft is affected by the magnetic fields created by the electromagnets. Conventional ferric materials may be attracted by electromagnetic fields, but are not generally repelled by conventional electromagnetic fields. Accordingly, it is desirable to pre-bias the opposing electromagnets in each bearing, to permit an increase in the attractive force of one electromagnet and a corresponding decrease in attractive force in the opposing electromagnet. In this way, a predetermined bias (null) force may be established such that the shaft is attracted in diametrically opposite directions by each electromagnet with substantially equal force and, hence, the shaft tends to remain in its natural null position. In practice, it is inevitably necessary to rapidly vary the strength of the flux field to ensure an essentially stable shaft.

More particularly, if the position of the shaft is known or can be inferred, the deviation of the shaft from a nominal position may be determined. Given this deviation, the amount of force necessary to return the shaft to its nominal position may be determined. Presently known systems typically define the amount of force necessary to control shaft position in terms of the voltage or current which must be applied to the electromagnetic coil to effect the desired force on the shaft.

Mature and powerful control algorithms currently exist for maintaining stable levitation through the use of a plurality of magnetic bearing pairs. Known algorithms utilize closed-loop control schemes, wherein a parameter indicative of shaft position (i.e., deviation from a nominal design axis) is used as a feedback parameter in conjunction with a digital, analog, or a combination digital/analog controller to control shaft position.

Control systems have been proposed which measure the position of the shaft directly, for example using an optical or other proximity sensor. Other systems sense shaft position indirectly, for example by monitoring the voltage and/or current present in the electromagnetic coil.

More particularly, a voltage applied across a coil will produce a proportional current in the coil. The current running through the coil, in turn, produces a flux in the gap between the coil and the shaft in proportion to the magnitude of the current. Finally, the force exerted by the electromagnet on the shaft is proportional to the square of the flux produced by the electromagnetic coil. Thus, current-based control systems using coil current as a feedback parameter have been widely proposed in the context of magnetic bearing shaft stabilization systems.

In addition to controlling shaft levitation, magnetic bearings may also be used to reduce cyclic disturbances present in the shaft. In particular, cyclic disturbances are commonly observed in rotating shafts due to, for example, asymmetric mass distribution within the shaft, frame vibration, and load disturbances which are transmitted back through the shaft. These cyclic disturbances, known as harmonic disturbances, typically exhibit frequencies which are integer multiples of the angular frequency of the shaft. For example, a shaft-driven propeller in an outboard boat motor may comprise three propeller blades; the shaft which drives the propeller would thus likely exhibit a harmonic disturbance equal to three times the angular frequency of the propeller shaft.

A magnetic bearing control system is needed which overcomes the shortcomings of the prior art. In particular, a control system is needed which controls the application of levitation and disturbance rejection forces to the shaft more accurately than existing systems. Moreover, a system is needed which coordinates the application of levitation and rejection disturbance forces to the shaft.

SUMMARY OF THE INVENTION

The present invention provides a control system for magnetic bearings which overcomes the shortcomings of the prior art.

In accordance with a preferred embodiment of the present invention, a magnetic bearing control system is provided which utilizes an integrated levitation and disturbance rejection control system. In accordance with one aspect of the present invention, the flux exhibited by and the current running through the electromagnetic coil are used as feedback parameters to the control unit.

BRIEF DESCRIPTION OF THE DRAWING FIGURES

The subject invention will hereinafter be described in conjunction with the appended drawing figures, wherein like numerals denote like elements, and wherein:

FIG. 4 is a block schematic diagram of an exemplary controller configured to control shaft position in accordance with the preferred embodiment of the present invention;

FIG. 8B is an alternative preferred embodiment of the control output configuration shown in FIG. 8A;

DETAILED DESCRIPTION OF PREFERRED EXEMPLARY EMBODIMENTS

Figure 1:
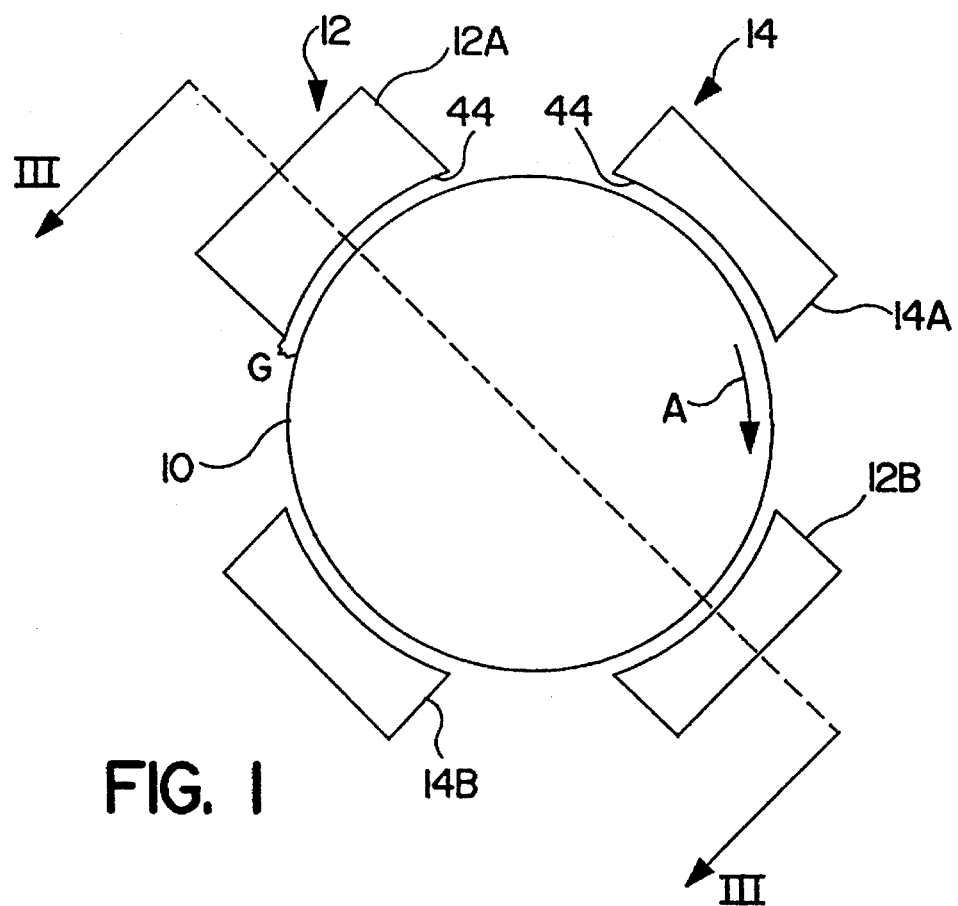
FIG. 1 is a schematic cross section view, taken along line I—I in FIG. 2, of an exemplary shaft having respective pairs of magnetic bearings disposed thereabout in accordance with a preferred embodiment of the present invention.
Figure 2:
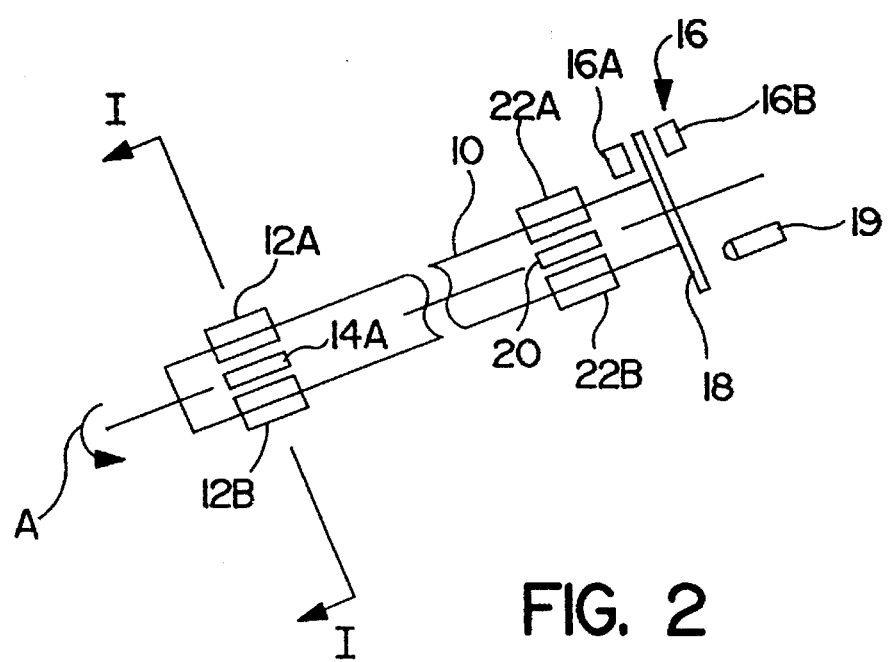
FIG. 2 is a schematic perspective view of a shaft having five pairs of magnetic bearings disposed thereabout for controlling the five recognized degrees of motion of a bearing-mounted shaft.

Referring now to FIGS. 1 and 2, a shaft 10 is suitably mounted (mountings not shown) for a rotation about its longitudinal axis 11 in the direction indicated by arrow A. Shaft 10 may be any suitable shaft, for example a drive shaft, crank shaft, power transmission shaft, or any other shaft which is bearing-mounted for rotation. Axis 11 corresponds to the desired axis of rotation of shaft 10 in the context of the particular application of shaft 10. Axis 11 is desirably selected to ensure smooth, stable operation of the shaft in a manner requiring a minimum of energy input from the magnetic bearing system. In most applications, axis 11 generally corresponds to the geometric axis of shaft 11.

One or more sets of oppositely disposed magnetic bearings are beneficially configured to support shaft 10. In the illustrated embodiment, respective bearing pairs 12 and 14 are configured about one end of shaft 10, and respective bearing pairs 20 and 22 shown as 22A and 22B are suitably mounted about the opposite end of shaft 10. Bearing pairs 12, 14 and 20, 22 shown as 22A and 22B are configured to support shaft 10 and to maintain the proper alignment of shaft 10 along axis 11. In addition, a thrust bearing pair 16 is suitably configured to control axial movement of shaft 10 along axis 11.

More particularly, axial bearing pair 16 suitably comprises respective bearings 16A and 16B, advantageously disposed on opposite sides of a bearing plate 18 rigidly connected to shaft 10. By applying predetermined electromagnetic forces to plate 18, bearing pair 16 controllably maintains shaft 10 within a predetermined region along axis 11.

Bearing pair 12 suitably comprises an upper bearing 12A and a lower bearing 12B; bearing pair 14 suitably comprises an upper bearing 14A and a lower bearing 14B. In order to efficiently distribute the weight of shaft 10 between respective bearing pairs 12 and 14 (as well as between bearing pairs 20 and 22 shown as 22A and 22B), bearing 14B and bearing 12B are suitably disposed at a 45 degree angle with respect to a vertical line extending through shaft 10. As discussed in greater detail below, bearing 12A is disposed 180 degrees opposite from bearing 12B, and bearing 14A is disposed 180 degrees opposite bearing 14B. Consequently, respective bearings 12A, 12B, 14A, and 14B are desirably disposed at 90 degree angles about the circumference of shaft 10.

Respective bearing pairs 20 and 22A are beneficially configured in the same manner as respective bearing pairs 12 and 14.

Figure 3:
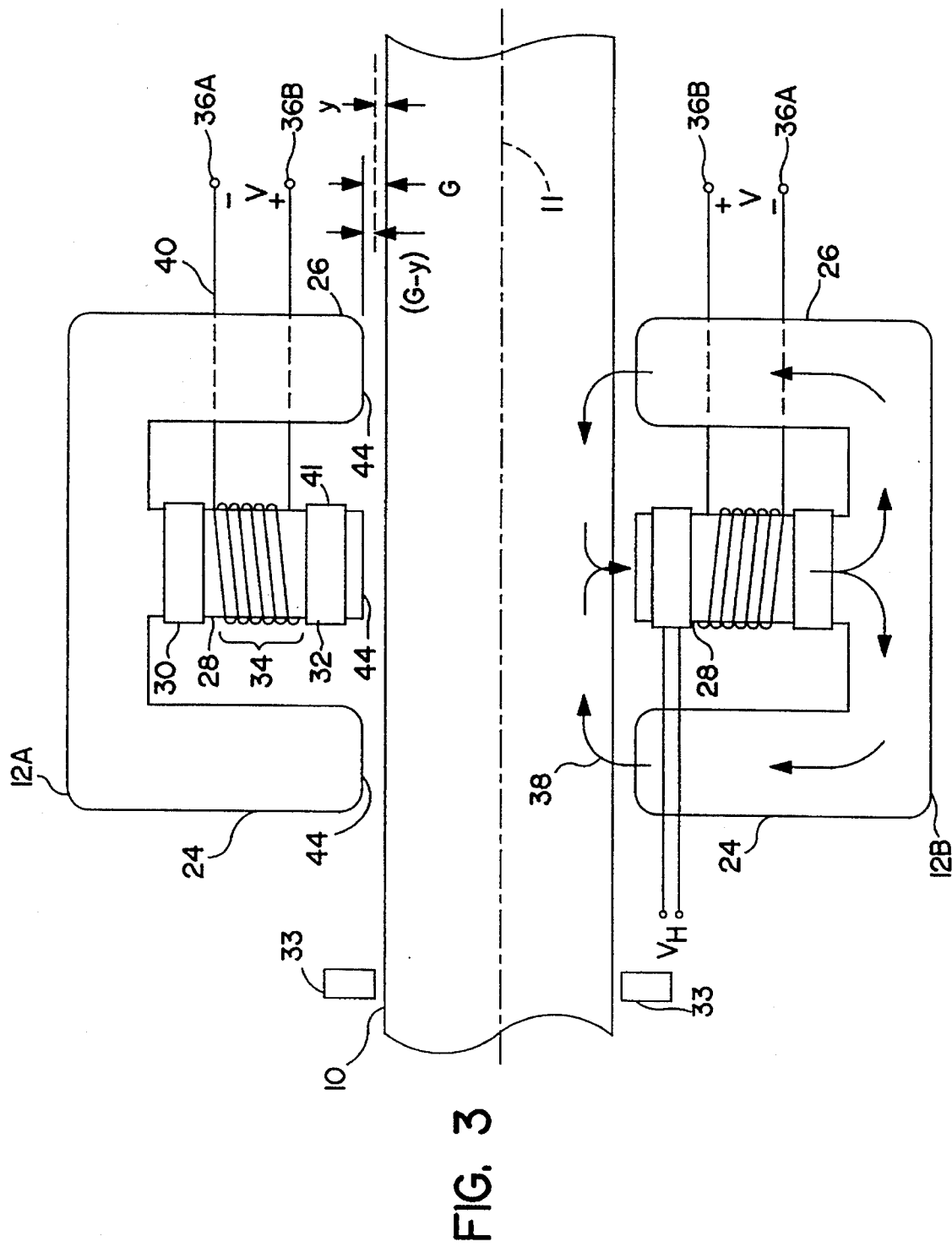
FIG. 3 is a schematic cross section view of the shaft and one pair of magnetic bearings taken along line III—III in FIG. 1.

Referring now to FIGS. 1 and 3, each bearing comprising one of respective bearing pairs 12, 14, 20, and 22 shown as 22A and 22B suitably comprises a ferromagnetic core having a first outside leg 24, a second outside leg 26, and a central core 28. Respective legs 24 and 26 are configured with an arcuate face 44 (best seen in FIG. 1) having a radius of curvature approximately equal to that of shaft 10. In the context of the illustrative embodiment, the surface area of face 44 of core 28 is advantageously equal to the combined surface areas of respective faces 44 of outside legs 24 and 26. The total area A of bearing 12A is thus equal to the sum of respective faces 44 of leg 24, leg 26, and core 28.

A conductive wire 40 cooperates with core 28 to form an electromagnet 41. Wire 40 is suitably wrapped around central core 28, thereby forming an electromagnetic coil 34 comprising N turns. The voltage V across coil 34 may be conveniently applied to and measured across respective nodes 36A and 36B.

A flux sensing device 32 and a flux rate sensing device 30 are suitably mounted at the distal and proximal ends, respectively, of core 28. Flux sensor 32 suitably comprises a linear Hall-effect sensor, for example a model number TL3103C manufactured by Texas Instruments. In accordance with one aspect of the present invention, flux rate sensing device 30 may comprise a secondary coil disposed between coil 34 and the base of core 28; alternatively, sensing device 30 may comprise a coil wound along core 28 substantially concurrently with coil 34. The function of these sensing devices will be discussed in greater detail below.

Each bearing is suitably disposed a predetermined distance from the outer circumference of shaft 10, to thereby form a gap G, for example on the order of about 0.010 inches to 0.030 inches. Each bearing may be advantageously made from a plurality of thin laminar slices, each lying in a plane substantially parallel to the plane of FIG. 3. In this way, the flux lines produced by electromagnet 41 are generally confined to a particular laminate, thereby minimizes eddy currents.

In the context of the present invention, shaft 10 may be made from any suitable ferrous material, for example one which promotes attractive electromagnetic interaction with the magnetic flux produced by electromagnet 41.

Voltage applied across coil 34 creates a current within the windings comprising coil 34 which, in turn, generates a magnetic flux through core 28. With particular reference to bearing 12B in FIG. 3, if node 36B is positive with respect to node 36A, a magnetic flux path is created within bearing 12B such that respective lines of flux 38 pass downwardly through core 28 and thereafter back upwardly through respective outside legs 24, 26. Flux lines 38 thereafter jump the gap between outside leg 24 and shaft 10 and between outside leg 26 and shaft 10, thereafter reconverge and travel downwardly across the gap between shaft 10 and core 28, and finally back down through core 28. The flux lines associated with bearing 12B create an attractive force tending to draw shaft 10 downwardly toward core 28 in FIG. 3. Inasmuch as shaft 10 is preferably made from a ferrous material and preferably does not comprise a permanent magnet, the flux which jumps the gap between shaft 10 and each of legs 24, 26 and core 28 results in an attractive force between bearing 12A and shaft 10, regardless of the direction of the flux lines. To the extent transient permanent magnetism may be induced in shaft 10, the attractive force generated by the flux lines at legs 24 and 26 would be reduced in accordance with the degree of transient permanent magnetism within shaft 10.

Bearing 12A functions in an analogous manner to create a corresponding attractive force which draws shaft 10 upwardly toward bearing 12A.

In the context of the present invention, respective bearings 12, 14, 16, 20, and 22 shown as 22A and 22B cooperate to levitate shaft 10 to thereby ensure that shaft 10 rotates substantially about axis 11. In addition, the bearings are also employed to effect disturbance rejection. To facilitate this discussion, the levitation and disturbance rejection mechanisms will hereinafter be discussed separately; thereafter, a control scheme for integrating these two functions will be described.

The levitation function essentially involves maintaining precisely controlled, varying magnetic fields within the gaps between shaft 10 and the various bearing components disposed about the circumference of shaft 10 to ensure smooth rotation of shaft 10 while avoiding contact between shaft 10 and the bearings. Moreover, the various bearing pairs 12, 14, 16, 20, and 22 may be controlled independently; that is, each bearing pair may be controlled independently of the other bearing pairs. Alternatively, the various bearing pairs may be controlled interactively, as discussed in greater detail below. In any event, the mechanism by which each of bearing pairs 12, 14, 16, 20, and 22 operates is advantageously identical. Accordingly, the operation of the various bearing pairs will now be discussed with reference to bearing pair 12.

The electromagnetic interaction between each electromagnet 41 and shaft 10 is in the nature of an attractive, rather than a repulsive, force. Consequently, it is desirable to bias the opposing electromagnets to a predetermined threshold steady state level. In this way, a sufficient range of increasing and decreasing electromagnetic forces may be exhibited by the electromagnets while still maintaining a minimum attractive force at the extreme end of the attraction force amplitude range.

With continued reference to FIG. 3, in a balanced, symmetric system with shaft 10 in the null position, the application of a voltage V across coil 34 of bearing 12A and across coil 34 of 12B will result in an upward attractive force exerted by bearing 12A which is equal in magnitude and opposite in direction to the downward attractive force exerted by bearing 12B on shaft 10. In the absence of external disturbances, shaft 10 would thus maintain a constant, equal distance between bearing 12A and bearing 12B (neglecting the weight of shaft 10, which may be conveniently compensated for). In reality, external forces impart slight movements to shaft 10, causing shaft 10 to deviate from its null position. The levitation control system of the present invention is suitably employed to compensate for these external forces in the following manner.

Referring now to FIG. 4, a schematic representation of an exemplary control system 400 suitably comprises a control unit 406 including a clock module 417, an analog amplifier 404, a biasing circuit 438, electromagnet 41 including coil 34, and flux sensor 32. In general operation, the position of shaft 10 (not shown in FIG. 4) with respect to electromagnet 41 is determined based on, for example, the flux sensed by flux sensor 32 and the current running through coil 34. A corresponding flux feedback signal 33 and a current feedback signal 43 are applied to control unit 406. Additional feedback signals 53, for example shaft speed and shaft angular position, are also applied to controller 406 for use in disturbance rejection control, discussed below in conjunction with, inter alia, FIGS. 7 and 8. Appropriate clock signals from clock module 417 are also applied to controller 406.

During steady state operations, controller 406 reads feedback signal 43 and flux signal 313 and, in response, calculates a value y (see FIG. 3) indicative of the extent to which shaft 10 deviates from its nominal position along axis 11. In the context of the subject description, upward movement of shaft 10 from its nominal position corresponds to a positive y value; conversely, movement of shaft 10 downwardly from its nominal position corresponds to a negative y value (see FIG. 3).

Upon determining the magnitude and direction of y (i.e., the position of shaft 10), controller 406 computes an appropriate control voltage signal V and applies this control signal to amplifier 404. Amplifier 404 appropriately amplifies control signal V and applies it to coil 34 to thereby increase or decrease the attractive force exerted by electromagnet 41 on shaft 10, as appropriate, to return shaft 10 to its nominal position. As discussed above, in order to ensure that sufficient attractive preload forces are exerted by each opposing bearing in a bearing pair, an equal bias voltage B is advantageously added to control voltage V in amplifier 404.

With continued reference to FIGS. 3 and 4, a spurious external force acting upwardly on shaft 10 will cause a transient upward displacement of shaft 10 by an amount y. The present inventors have determined that during such spurious displacements, the flux exhibited by electromagnet 41 remains essentially stable and, hence, the force exerted by electromagnet 41 on shaft 10 during such a spurious displacement remains essentially constant. However, the current through coil 34 of bearing 12A decreases in proportion to y. Similarly, the flux exhibited by bearing 12B remains essentially constant, and the current running through coil 34 of bearing 12B increases in proportion to y as shaft 10 moves upwardly away from bearing 12B.

In order to compensate for the spurious upward deflection of shaft 10, controller 406 generates control signal V which, when applied to bearing pair 12 by analog amplifier 404, simultaneously decreases the attractive force exerted by bearing 12A on shaft 10 and increases the attractive force exerted by bearing 12B on shaft 10. The precise manner in which control signal V is generated will be discussed in greater detail below including, for example, in conjunction with FIG. 7.

In accordance with one aspect of the present invention, it is desirable to use a single control signal V to control both bearings comprising a particular bearing pair; control signal V may thus be suitably applied directly to bearing 12A at a first polarity, and inverted and applied to bearing 12B at a second, opposite polarity. In this way, a control signal of equal magnitude but opposite polarity may be applied to bearings 12A and 12B, respectively. Alternatively, controller 406 and amplifier 404 may be suitably configured to generate separate control signals for each bearing comprising one or more bearing pairs. Such separate control signals may be derived independently from or interdependently with one another, as described below.

It can thus be seen that as shaft 10 deviates slightly from its null position, a relatively small electromotive force is required to return shaft 10 to its null position. Similarly, for relatively large external forces which cause shaft 10 to deviate from its null position by a large amount, a correspondingly high applied electromotive force is required to return shaft 10 to its null position. For this reason, inter alia, the present inventors have adopted a spring model for controlling levitation.

More particularly, conventional spring theory may be stated as:

$$F = K_s X \tag{1}$$

where F corresponds to the spring force, X corresponds to the variation in length from the relaxed (null) spring position, and $K_s$ is a constant which defines physical characteristics of the spring system.

Analogously, the bearing/shaft system of the present invention may be conveniently modeled as:

$$V_i = K_i G'_i \tag{2}$$

where $V_i$ corresponds to the control voltage applied across coil 34 (and which may be characterized as an electromotive force (EMF) which generates a corresponding flux resulting in an electromagnetic attraction (force) exerted by the electromagnet upon shaft 10); $K_i$ corresponds to a physical constant representative of mechanical characteristics of the system; and $G'_i$ corresponds to the distance between the bearing and shaft 10 (i.e., $G' = G - y$). As will be hereinafter discussed, i may have a value from 1 to 5, for example if a separate control signal is generated for each of the five bearing pairs (12, 14, 16, 20, and 22); alternatively, i may range from 1 to 10, for example if a separate control signal is generated for each of the ten bearings comprising the five bearing pairs.

Although the expression $V_i = K_i G'_i$ accurately describes the shaft/magnetic bearing system of the present invention to a first order of approximation, more precise control may be obtained by employing variations of this equation. For example, those skilled in the art will appreciate that, for a particular bearing, a proportional-integral-derivative (PID) relationship may be employed:

$$V = K_P G'(t_0) + K_I \left( \sum_{n=o}^{\infty} G'(t_n) \right) + K_D(G'(t_0) - G'(t_{-1})) \tag{3}$$

where $K_P$ is a proportional coefficient; $K_I$ is an integral coefficient; $K_D$ is a derivative coefficient; $G'(t_0)$ corresponds to the value of G' during the current sample period; and $G(t_{-1})$ corresponds to the value of G' during the preceding sample period.

Alternatively, a proportional-derivative (PD) relationship may be employed, or any other suitable control scheme as may be appropriate for a particular application. In an alternate preferred embodiment, each of the various control signals generated for each bearing (or bearing pair) may be interdependent upon the value of G' associated with the various other bearings, so that each control signal $V_i$ is a function of G' for some or all of the other bearings. It can thus be seen that the calculation of the levitation control signals may employ up to several hundred unique coefficients, for example when the various control signals are computed in an interdependent manner using complex control relationships. Those skilled in the art will appreciate that the selection of an appropriate control scheme, including the form of the equations which relate the magnitude of the control signal V to the gap G', as well as the various coefficients employed in such equations, will necessarily be application-specific and involve the subjective judgment of the control engineer. Those skilled in the art will also appreciate that powerful and mature optimization techniques and control algorithms are readily available for use in structuring an appropriate control scheme.

In a preferred embodiment of the present invention, the gap distance G is not measured directly; rather, G is computed from known quantities, as discussed below. In an alternate embodiment of the present invention, gap G may be measured directly, for example by one or more suitable position sensors 33 conveniently mounted to or proximate one or both of the various bearing pairs (see FIG. 3). Moreover, position sensors 33, for example optical and/or any other convenient position sensors, may be employed in addition to or in lieu of the position sensing mechanism discussed herein.

More particularly, the flux (ø) produced by coil 34 which acts on shaft 10 may be defined as:

$$\phi = \frac{\mu_0 NIA}{2G'} \tag{4}$$

where $\mu_0$ is the permeability of free space ($\mu_0 = 4\Pi \times 10^{-7}$ henry/m); N corresponds to the number of turns comprising coil 34; I is the current through coil 34; and A corresponds to the aggregate square area of face 44 of core 28 and respective legs 24, 26.

Rearranging Equation (4), gap G' may be expressed as:

$$G' = \frac{\mu_0 NIA}{2\phi} \tag{5}$$

Figure 6:
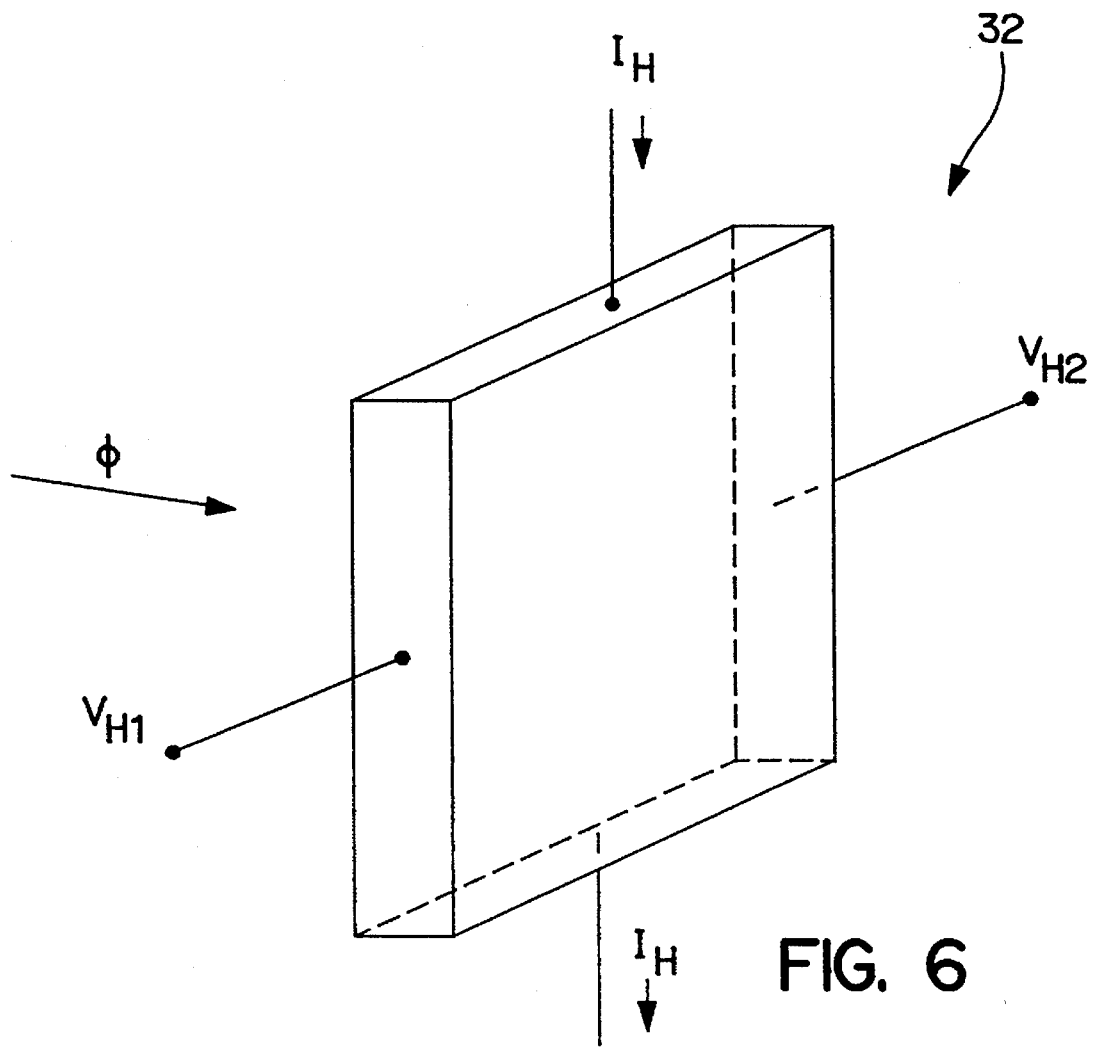
FIG. 6 is a diagrammatic view of an exemplary flux sensor in accordance with one aspect of the present invention.

As stated above, the magnitude of the flux ø acting on shaft 10 from a particular bearing (neglecting leakage, eddies, and the like) is suitably measured directly by flux sensor 32. With momentary reference to FIG. 6, sensor 32 suitably comprises a four terminal semi-conductor device configured to generate an output voltage ($V_{H1}-V_{H2}$) indicative of the magnitude of the flux applied orthogonally through the device. A predetermined hall current $I_H$ is applied to the device as indicated in FIG. 6; as the current-carrying electrons migrate towards either the $V_{H1}$ or $V_{H2}$ end of the device (depending on the orientation of the flux), an electric field is created within sensor 32, the magnitude of which is proportional to the applied flux. The voltage differential ($V_{H1}-V_2$) indicative of this internal electric field is thus fairly representative of the magnitude of the applied flux.

By measuring the flux ø and the current I associated with coil 34, in conjunction with known values of $\mu_0$, N, and A, the gap G' may be unambiguously determined. Having determined G', an appropriate control voltage signal V may thus be calculated for each bearing pair or bearing, as desired.

In accordance with a further aspect of the invention, the magnetic bearings may also be employed to effect disturbance rejection. More particularly, a number of different factors, both external to and integral to shaft 10, impart disturbances to shaft 10. In many instances, these disturbances are sinusoidal in nature, often exhibiting a frequency which is an integer multiple of the angular frequency of shaft 10. As discussed in greater detail below, the disturbance rejection control scheme may be coordinated with the levitation control scheme in a single, integrated control system. Alternatively, the disturbance rejection control scheme may be simply superimposed on the levitation control scheme, or applied independently thereof.

One of the principal sources of harmonic disturbances within shaft 10 is the shaft itself. That is, any asymmetry in the mass distribution of the shaft, or any deviation from a true straight line axis associated with shaft 10 may result in the generation of harmonic disturbances within shaft 10, typically at a frequency equal to the frequency of shaft 10 rotation. In addition, characteristics associated with the load which is driven by shaft 10 may also impart disturbances to shaft 10. Moreover, nearby rotating and/or reciprocating machinery may also impose harmonic disturbances on shaft 10.

Figure 5A:
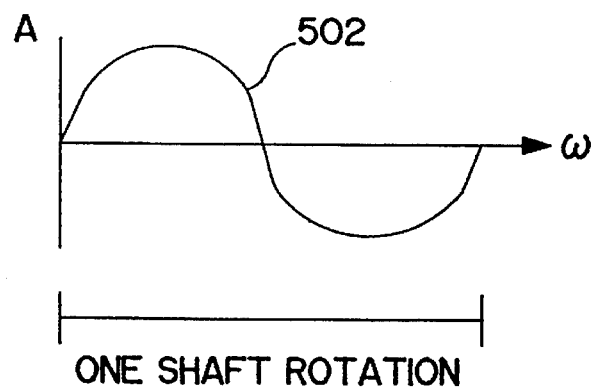
FIGS. 5A–5C illustrate exemplary disturbance rejection wave forms in accordance with one aspect of the present invention.
Figure 5B:
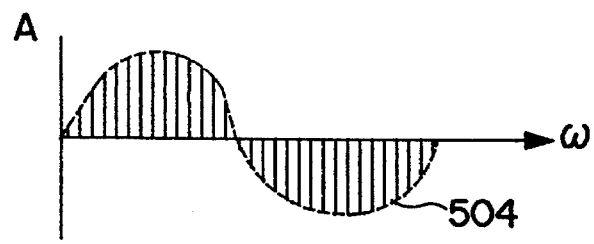
Figure 5C:
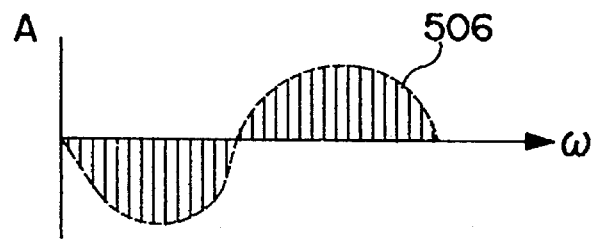

Referring now to FIGS. 5A–C, a typical harmonic disturbance exhibits a sinusoidal variation in amplitude and, thus, may be characterized by a sinusoidal waveform 502. With particular reference to FIG. 5A, an exemplary sinusoidal waveform disturbance 502 exhibits a single sinusoidal period during one rotation of shaft 10. Those skilled in art will appreciate that higher order harmonic disturbances will exhibit a sinusoidal characteristic having a frequency which is an integer multiple of shaft frequency, and thus exhibit an integer multiple of periods within a single shaft rotation.

Through the use of digital sampling techniques, the amplitude of the sinusoidal disturbance may be sampled synchronously with shaft rotation, for example by providing shaft 10 with a suitable mechanism (e.g. end cap or bearing plate 18) for indicating the angular position of the shaft. In this regard, a suitable proximity sensor 19 may be conveniently mounted proximate end cap 18 for sensing the angular position of shaft 10. In a preferred embodiment, end cap 18 suitably comprises either 32 or 64 equally spaced indicia of angular position, such that proximity sensor 19 may conveniently sense 32 or 64 discreet shaft positions per cycle of shaft rotation, as desired. With particular reference to FIG. 5B, the sampled amplitudes of sinusoidal waveform disturbance 502 (FIG. 5A) may be represented as a digital waveform 504.

Through the use of known techniques, for example as described in Taylor U.S. Pat. No. 4,947,435 issued Aug. 7, 1990, the sampled digital data for one or more periods (e.g., two periods) may be stored and manipulated to arrive at a predicted value of the disturbance for the next succeeding period (shaft cycle). This projected waveform may then be phase shifted by 180 degrees to generate an anti-noise waveform 506 shown in FIG. 5C. By applying appropriate control signals to amplifier 404 (FIG. 4) and, hence, applying corresponding forces to shaft 10 in accordance output waveform 506 during each period of shaft rotation, disturbance 502 may be substantially canceled.

The operation of the control system shown in FIG. 4, including the integrated operation of levitation control and disturbance rejection control, will now be described in conjunction with a single bearing pair, it being understood that the control circuitry suitably functions to generate control signals in respect of all bearings and/or bearing pairs, in an independent or interdependent manner, as desired.

Figure 8A:
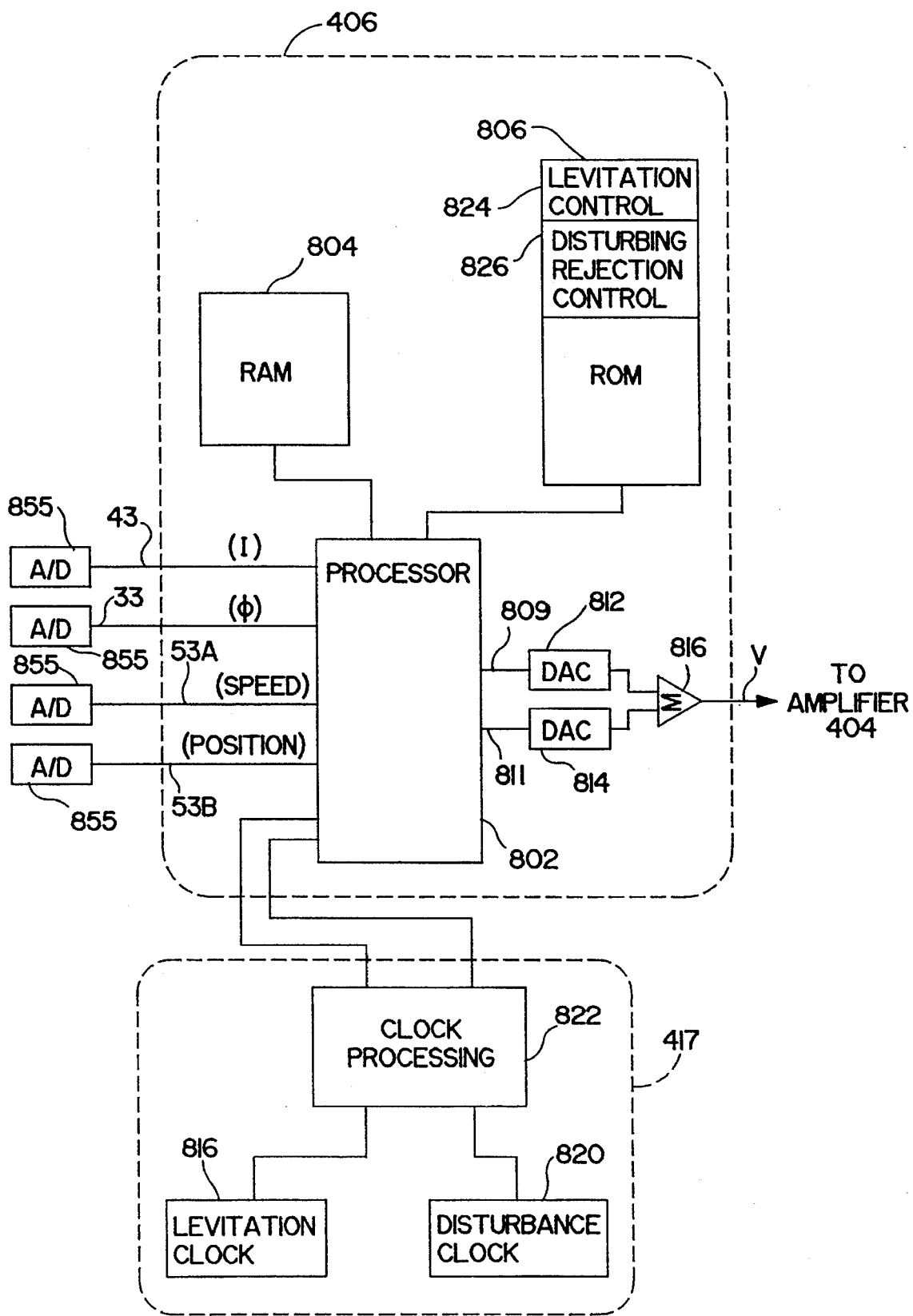
FIG. 8A is a block schematic diagram of clock processing and control circuitry in accordance with the preferred embodiment of the present invention.

Referring now to FIG. 8A, the foregoing levitation and disturbance rejection schemes may be advantageously implemented in the context of a single, integrated control circuit 402 comprising controller 406 and clock module 417.

More particularly, controller 406 suitably comprises a processor 802, for example a conventional multipurpose digital controller, a RAM 804, a ROM 806 including a levitation control sector 824 and a disturbance rejection control sector 826, a first DAC 812, a second DAC 814, a summer 816, and various process control and feedback inputs, including current feedback signal 43, flux feedback signal 33, a shaft speed input signal 53A, and a shaft position input signal 53B. Respective analog to digital converters (A/D converters) 855 are suitably interposed between processor 802 and the source of the various sensed inputs to facilitate the interface between the analog sensed parameter and the digital operation of processor 802. Respective converters 855 may be disposed proximate processor 802 or, alternatively, they may be disposed proximate the sensing site, for example integral with the sensor (e.g., proximity center 19). Clock module 417 suitably comprises a levitation clock 818, a disturbance clock 820, and a clock processing module 822.

During steady state operation of controller 406, levitation control is effected by sensing current feedback signal 43 and flux feedback signal 33, and calculating a desired levitation control signal 809, as discussed in detail above. Levitation control signal 809 is applied to DAC 812; the output of DAC 812 is applied to summer 816. In addition, processor 802 generates a disturbance rejection control signal 811 in accordance with respective feedback signals 33 and 43 and, in a preferred exemplary embodiment, speed signal 53A and position signal 53B. Disturbance signal 811 is applied to DAC 814, the output of which is summed with the output of DAC 812 at summer 816. The output of summer 816 thus comprises an analog representation of control signal V which is subsequently applied to analog amplifier 404.

The configuration of DAC 812, DAC 814, and summer 816 set forth in FIG. 8A is particularly useful when control circuit 400 is configured to generate a single control signal V for each bearing pair. As discussed in greater detail below in conjunction with FIGS. 9A–C, the output of summer 816, namely control signal V, is applied to an amplifier circuit which advantageously directly applies control signal V to a first amplifier circuit associated with one of the bearings comprising a bearing pair (e.g., bearing 12A). In addition, control signal V is also inverted, and the corresponding reverse polarity control signal (–V) is applied to a second amplifier circuit associated with the complimentary, oppositely disposed bearing corresponding to the same bearing pair (e.g., bearing 12B). Before the corresponding non-inverted and inverted control signals are applied to their respective bearings, however, a suitably identical analog bias signal is added to each of the control signals, as discussed in greater detail below in conjunction with FIGS. 9A–C.

With momentary reference to FIG. 8B, control signal V may alternatively be digitally biased, for example through the application of an appropriate bias signal from a digital biasing circuit 817, prior to applying the control signal to its corresponding analog amplifier circuit. The configuration shown in FIG. 8B is particularly useful when control circuit 400 is configured to generate a separate control signal V for each bearing, as opposed to each bearing pair.

As stated previously, the manner in which each bearing pair implements levitation and disturbance rejection control is suitably identical to each other bearing pair. Of course, the magnitude of the voltage signals applied to each bearing will necessarily be different among the various bearings inasmuch as each bearing, being disposed at a different point on shaft 10, will inevitably sense a unique displacement/disturbance pattern. As also further stated above, the control algorithm used to determine the voltage levels applied to nodes 36A, 36B for each bearing may be operated independently for each bearing or bearing pair, or the control algorithm may be implemented in an interdependent manner, such that the transfer functions associated with each bearing or bearing pair are interrelated with the transfer functions used for the other bearings and/or bearing pairs.

With continued reference to FIG. 8A, in a first preferred exemplary embodiment the levitation control algorithm is executed synchronously; that is, levitation clock 818 initiates a levitation computation cycle such that the level of current within coil 34 and the flux sensed by sensor 32 (see FIG. 3) is sampled, and a corresponding output signal 809 is calculated once for each of a predetermined number of sample periods associated with each rotation of shaft 10. In a particularly preferred embodiment, one shaft rotation corresponds to 64 sample periods.

Alternatively, levitation control may be effected in the context of a fixed rate sampling scheme, such that a predetermined number of sample periods occur within a defined unit of time, regardless of shaft speed. Such a fixed rate scheme has the advantage functioning effectively at very low shaft speeds or even when the shaft is stationary. With synchronous control, on the other hand, levitation control effectively ceases at very low shaft speeds.

Disturbance control clock 820 may also operate synchronously (i.e., a predetermined number of sample/calculation periods per shaft rotation) or at a predetermined sample rate per unit time (i.e., independent of shaft speed).

Clock processing module 822 suitably coordinates the functions of levitation clock 818 and disturbance clock 820. More particularly, clock processing module 822 may be configured such that the operator may select between shaft-synchronous and fixed rate sampling modes of operation for the levitation control and disturbance control schemes. In addition, clock processing module 822 may be configured to compensate for levitation clock 818 during synchronous operation at low shaft speeds. In particular, when the levitation control system (including levitation clock 818) is operating in a synchronous mode, clock processing module 822 may be configured to apply a predetermined minimum sample rate to processor 802 when shaft 10 falls below a predetermined minimum angular frequency. In this way, satisfactory levitation control may be assured even at low shaft speeds.

Clock processing module 822 may also be configured to synchronize the rate of levitation clock 818 with the rate of disturbance clock 820 at high shaft speeds, for example when neither clock is operating at a fixed rate mode.

With momentary reference to FIG. 4, analog amplifier 404 suitably comprises an inverting amplifier circuit 902 and a transconductance amplifier circuit 932, described in greater detail below in connection with FIGS. 9A–9C.

Figure 9A:
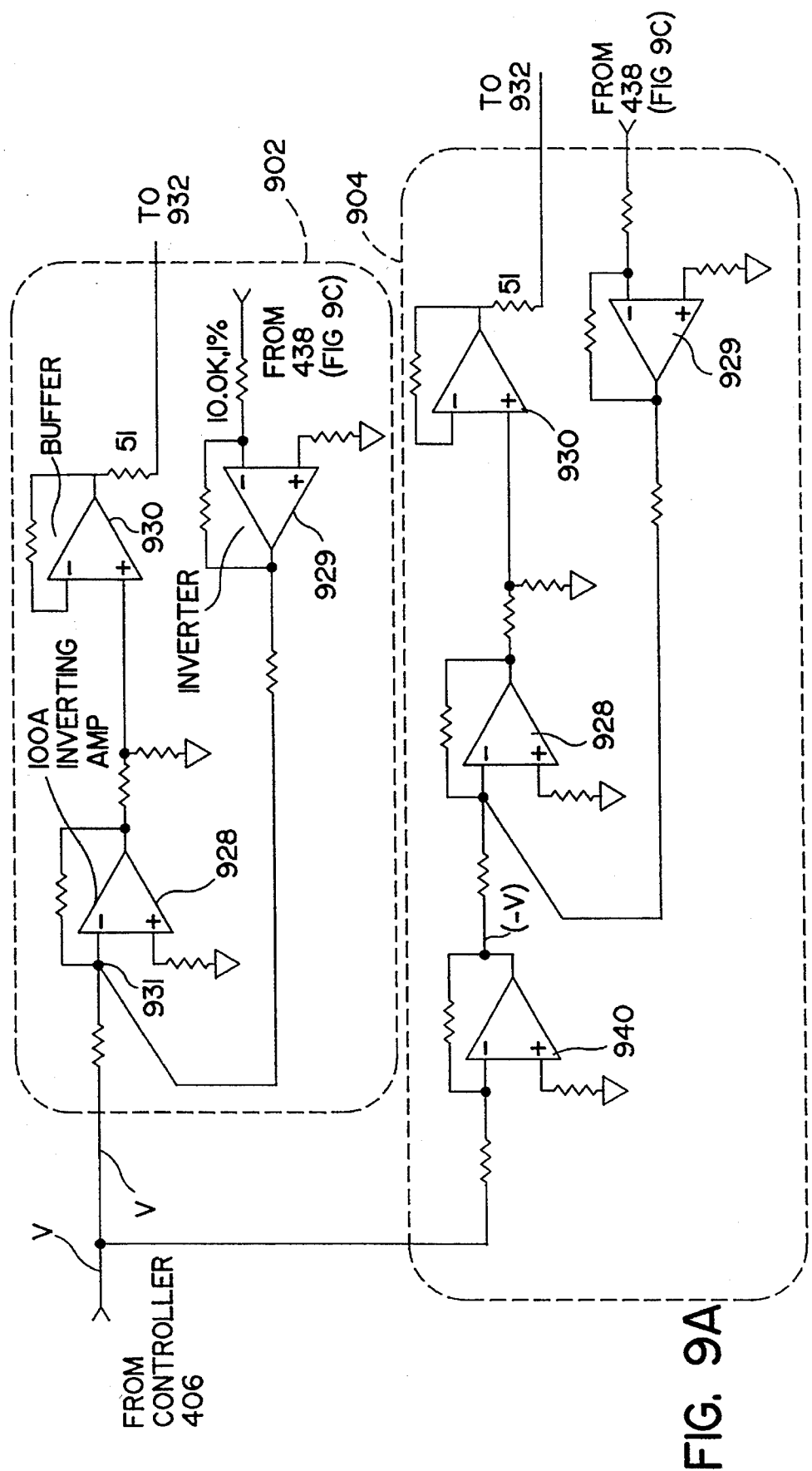
FIGS. 9A–9C are electrical schematic diagrams of the analog amplifier in biasing circuit shown in FIG. 6.

Referring now to FIG. 9A, the output from control unit 406 (see FIG. 8A), namely control signal V, is suitably applied to amplifier circuit 902, corresponding to upper bearing 12A and to a corresponding amplifier circuit 904 associated with bearing 12B (see FIG. 3). Each of respective amplifier circuits 902 and 904 suitably comprise an amplifier 928, for example a minus 100 gain inverting amplifier, a buffer 930, and an invertor 929. In addition, amplifier circuit 904 further comprises an invertor 940. Each of amplifiers 928, 929, 930, and 940 are suitably adapted from component number TL074 manufactured by Texas Instruments.

Figure 9B:
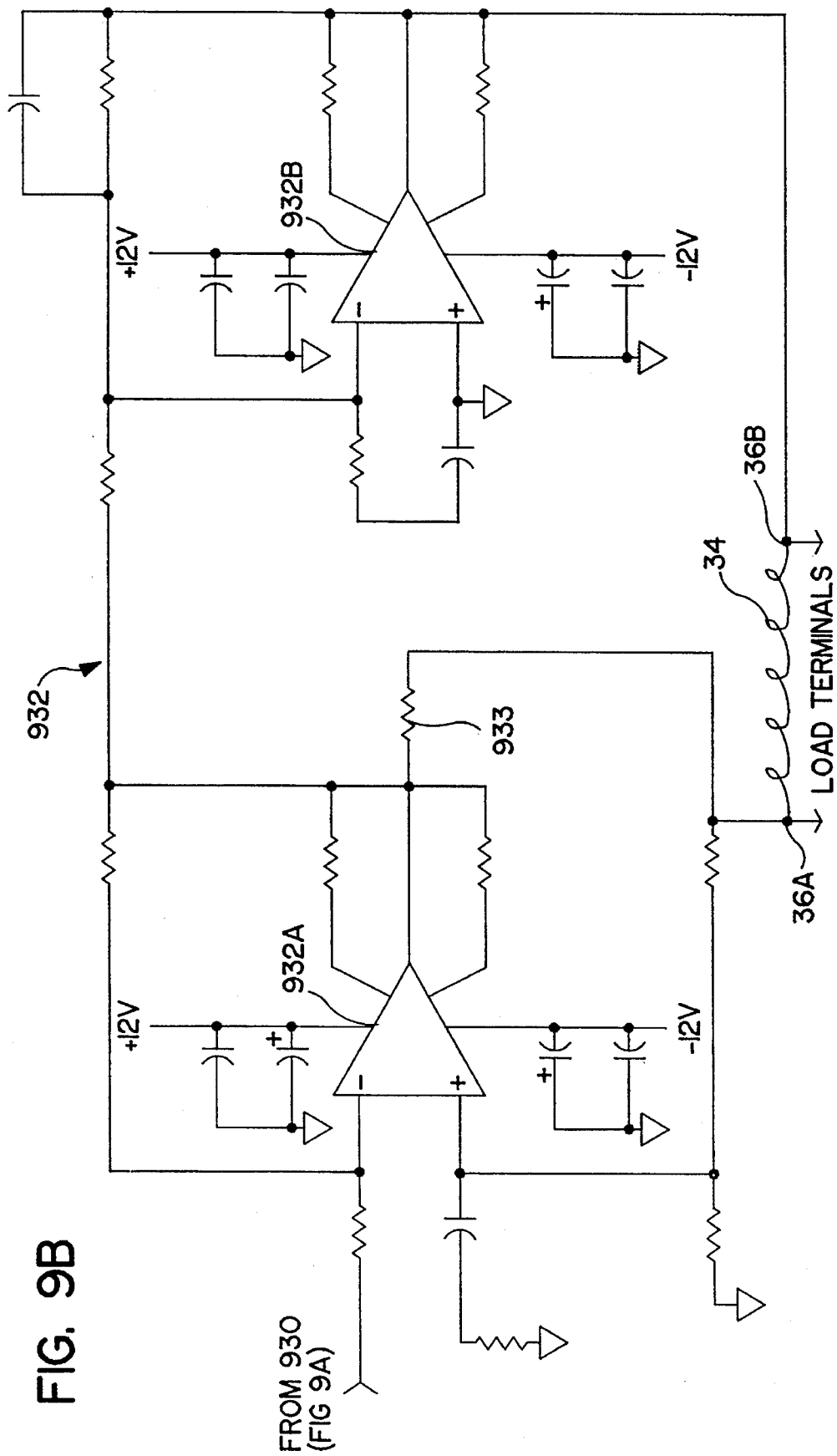
Figure 9C:
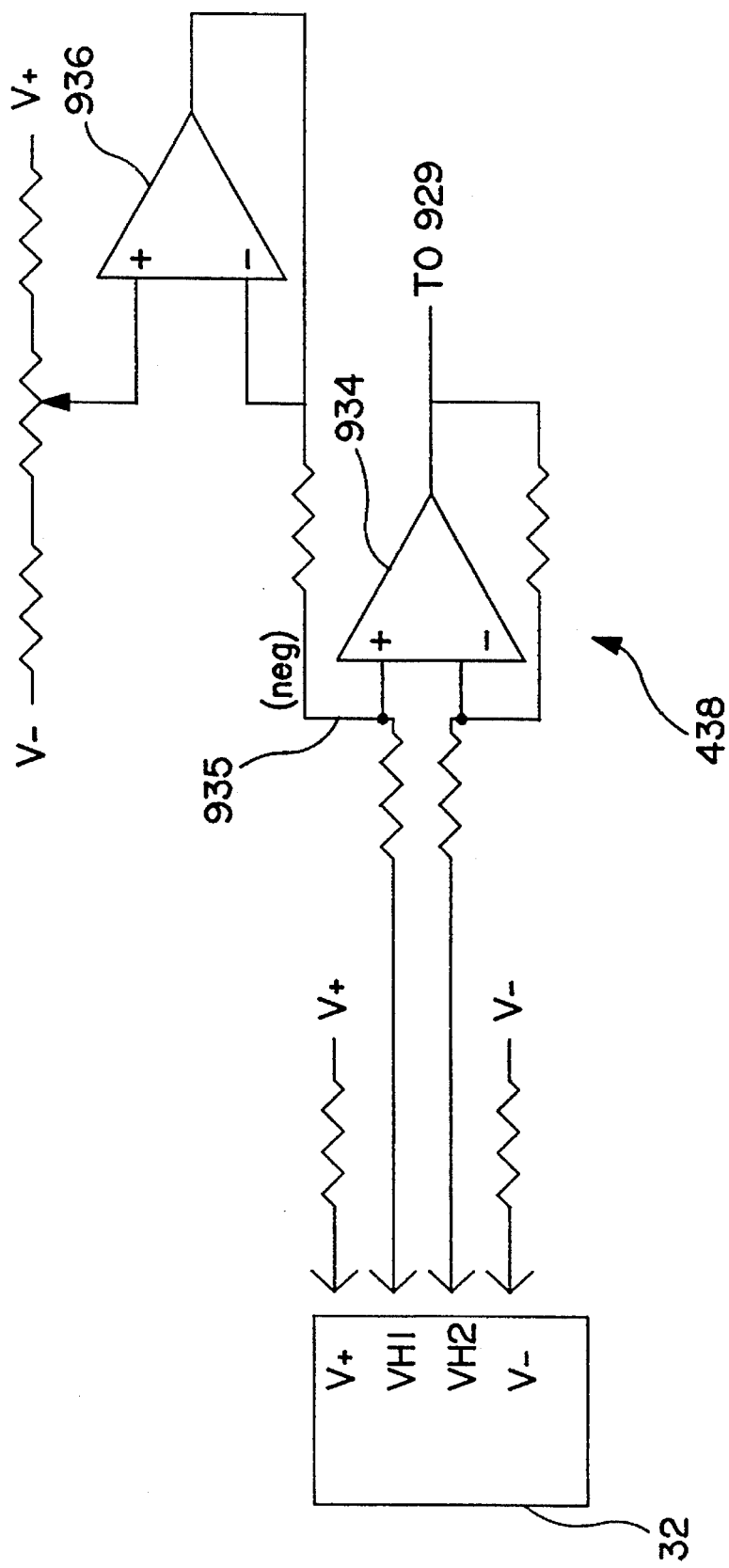

In accordance with the preferred exemplary embodiment illustrated in FIGS. 9A–9C, the output of biasing circuit 438 is suitably inverted at invertor 929 and summed with control signal V at a summing junction 931 associated with the input to amplifier 928. The output of amplifier 928 is suitably buffered by buffer 930 and applied to transconductance amplifier circuit 932.

Referring now to FIG. 9B, a single transconductance amplifier 932, for example the transconductance amplifier associated with upper bearing amplifier circuit 902, is illustrated for clarity, it being understood that a similar transconductance amplifier (not shown) is also advantageously configured to cooperate with lower bearing amplifier circuit 904. In the illustrated embodiment, transconductance amplifier 932 suitably comprises a first amplifier 932A and a second amplifier 932B, each of which suitably comprise a part number PA12 manufactured by Apex Microtechnologies. Together, amplifiers 932A and 932B function as a bridge amplifier circuit configured to supply in the range of +/− 20 volts across coil 34. By bridging the two 12-volt amplifiers together, the desired +/−20 volts may be conveniently achieved.

The output from amplifier circuit 902 (FIG. 9A) is suitably applied to an input of amplifier 932A. In response to this applied voltage, transconductance amplifier circuit 932 applies a corresponding current to coil 34. As previously discussed above in greater detail, the current through coil 34 generates a proportional flux which attracts shaft 10 with a predetermined force tending to null shaft 10.

Referring now to FIG. 9C, bias circuit 438 suitably comprises respective unity gain differential amplifiers 934 and 936, each of which suitably comprise a part number TL074 manufactured by Texas Instruments. In a preferred embodiment, a separate bias circuit 438 cooperates with upper bearing amplifier circuit 902 and lower bearing circuit 904 (see FIG. 9A); however, for clarity, only a single biasing circuit is illustrated.

With continued reference to FIG. 9C and with momentary reference to FIG. 4, flux sensor 32 senses the flux from coil 34 and applies a voltage signal indicative of the sensed flux to amplifier 934. In addition, a predetermined bias voltage is summed with the output of sensor 32 at a summing junction 935 associated with the positive input of amplifier 934. The output of amplifier 934 is suitably applied to invertor 929 of amplifier circuit 902 (FIG. 9A).

Figure 10A:
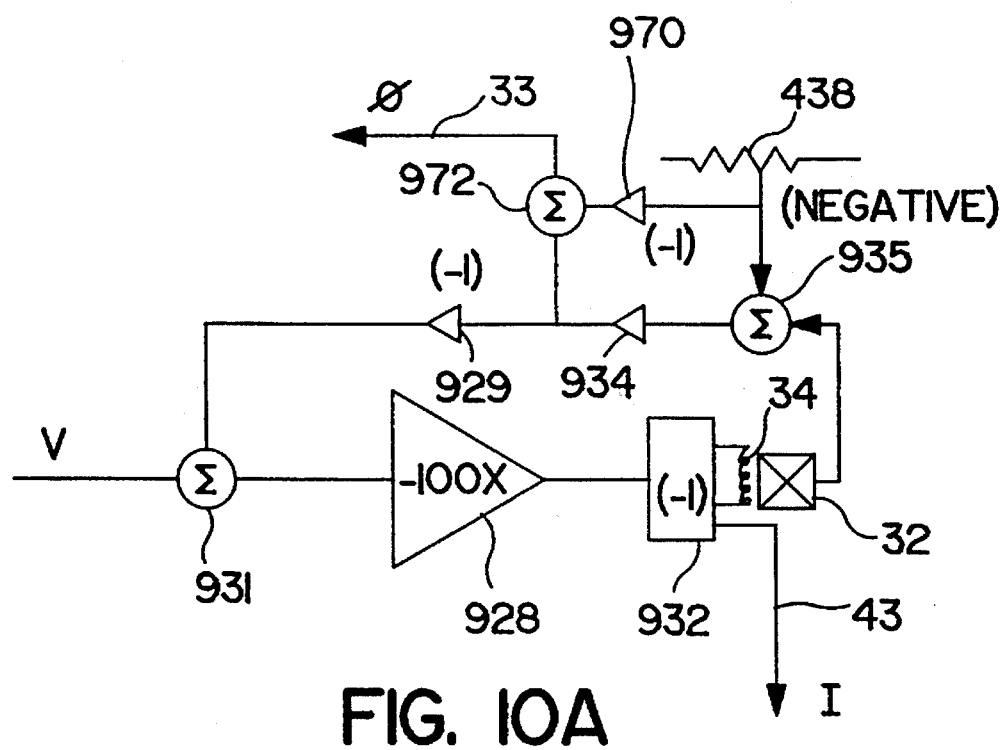
FIG. 10A is an electrical schematic diagram of the amplifier feedback loop shown in FIGS. 9A–9C.

Referring now to FIG. 10A, the total flux extant at coil 34 is equal to the flux due to control signal V plus the flux due to the bias voltage. In order to effectively employ flux feedback in the context of a preferred embodiment of the present invention, it is desirable that feedback signal 33 (applied to control unit 406; see FIG. 4) comprise indicia of this total flux. Similarly, it is desirable that feedback signal 43 (also fed back to processor 406; see FIG. 4) comprise indicia of the total current flowing through coil 34. Hence, current signal 43 may be sensed at any convenient location within the circuitry associated with coil 34, for example at a sensing resistor 933 within transconductance amplifier 932 (see FIG. 9B).

In the context of a preferred embodiment of the present invention, the use of coil current and total coil flux as feedback signals to controller 406 permits more precise control over shaft 10 than is otherwise obtainable using coil voltage and coil current as feedback signals. An even higher degree of control is obtainable by also employing indicia of coil flux as a secondary feedback loop within the analog amplifier circuitry.

With continued reference to FIG. 10A, it may be seen that the negative bias voltage from bias circuit 438 is summed with the output of sensor 32 at summing junction 935. Stated another way, the bias flux component of the total flux at coil 34 is subtracted from the output of sensor 32 before the flux signal is fed back into amplifier 928 (see also FIGS. 9A and 9C). The present inventors have determined that it is desirable to add the bias flux voltage in the feedback loop between sensor 32 and amplifier 928, as opposed to adding the bias flux directly to amplifier 928. In this way, the flux signal fed back from amplifier 434 and combined with the command flux signal (i.e., control signal V) at the input of amplifier 928 is appropriately indicative of the flux component of total flux which is attributable to control signal V.

In order to ensure that the flux signal in the "tight" analog amplifier feedback loop is representative of control signal V's contribution to total flux, while ensuring that flux feedback signal 33 is representative of total flux, it is desirable to add the bias voltage back into the output of amplifier 934 before feeding flux signal 33 back to processor 406 in the primary control loop. Accordingly, the negative bias voltage from bias circuit 438 may be conveniently inverted by an invertor 970 and summed with the output of amplifier 934 at a summing junction 972 to produce flux signal 33 indicative of total flux at coil 34.

Figure 10B:
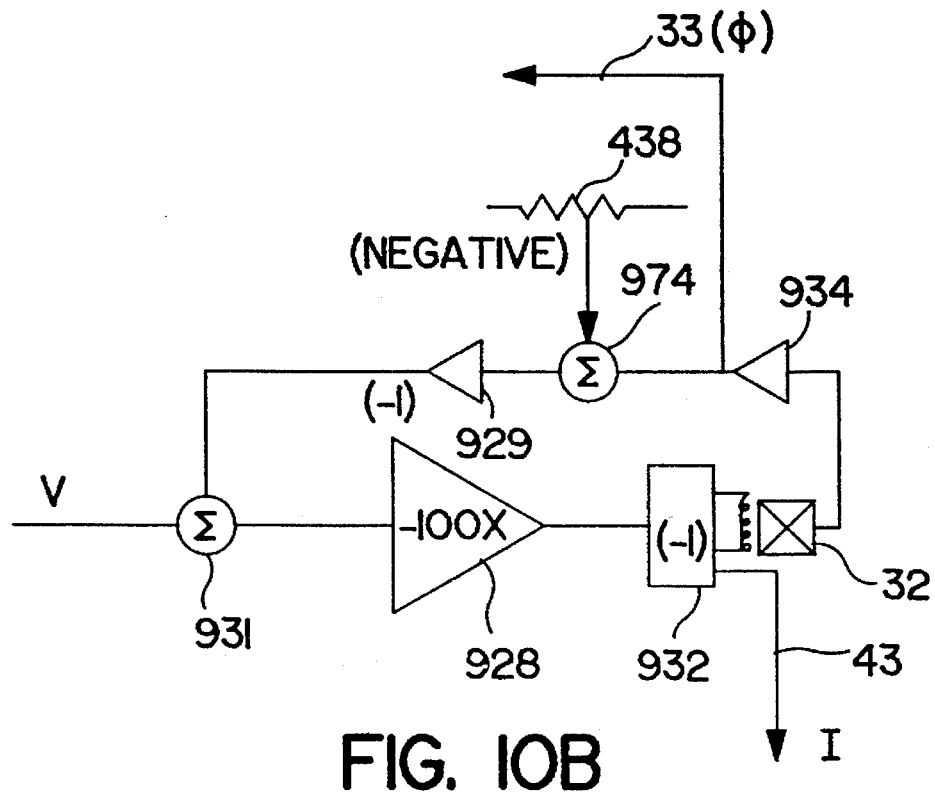
FIG. 10B is an alternative embodiment of the feedback loop shown in FIG. 10A.

With momentary reference to FIG. 10B, an alternative embodiment of the primary and secondary flux feedback paths applies the output of sensor 32 (indicative of total coil flux) to amplifier 934, and thereafter sensing the output of amplifier 934 and applying this output to processor 406 as feedback signal 33. Thereafter, the output of amplifier 934 may be summed with the bias voltage, for example at a summing junction 974. In this way, flux feedback signal 33 may be conveniently sensed from the secondary feedback loop and fed back to control unit 406.

The operation of control unit 406 will now be described in conjunction with FIG. 7.

Upon an initial power up (step 702), control unit 406 waits for an interrupt from clock processing module 822 (step 704). Upon receipt of an interrupt indicating the beginning of a sample period, control unit 406 reads the appropriate input values, depending on the nature of the interrupt from clock processing module 822.

More particularly, an interrupt from clock processing module 822 may comprise a levitation clock interrupt (step 705B), a disturbance rejection clock interrupt, or a hybrid interrupt (step 705A) (for example when the levitation control scheme operates synchronously with the disturbance rejection control scheme).

In a first preferred embodiment, levitation and disturbance rejection are both effected synchronously with shaft rotation. That is, the sample (interrupt) frequency of the levitation control scheme and of the disturbance rejection control scheme are an integer multiple of shaft speed; typically, the sample frequency may be on the order of $2^m$ times per shaft rotation, where m is a positive integer to accommodate digital computation. In a preferred embodiment, control is effected 64 times per shaft rotation.

If levitation control and disturbance rejection control are effected in synchrony with each other ("yes" branch from step 705A), the control equations are appropriately engineered so that the function of levitation and the function of disturbance rejection are reflected in the equations. In this case, the inputs appropriate for executing the hybrid algorithm control equations would be read (step 705A); in the preferred embodiment discussed herein, coil current (feedback signal 43), coil flux (feedback signal 33), shaft speed (feedback signal 53A), and shaft position (feedback signal 53B) would be read (see FIG. 8A). Appropriate values are computed for $G_1$ through $G_5$ (if a single control signal is calculated for each bearing pair) or, alternatively, appropriate values of $G_1$ through $G_{10}$ (if a separate control signal is generated for each bearing) (step 708A).

Thereafter, appropriate control signals $V_1$ through $V_5$ (if a single control signal is calculated for each bearing pair) or, alternatively, control signals $V_1$ through $V_{10}$ (if a separate control signal is calculated for each bearing) are determined using the appropriate control equations (step 710A). Thereafter, the appropriate control voltage signals $V_i$ are applied to analog amplifier circuit 404 (see FIG. 6) for processing and subsequent application to the corresponding electromagnets associated with each bearing (step 712). The system then returns to step 704 to wait for another interrupt (step 713).

Figure 7:
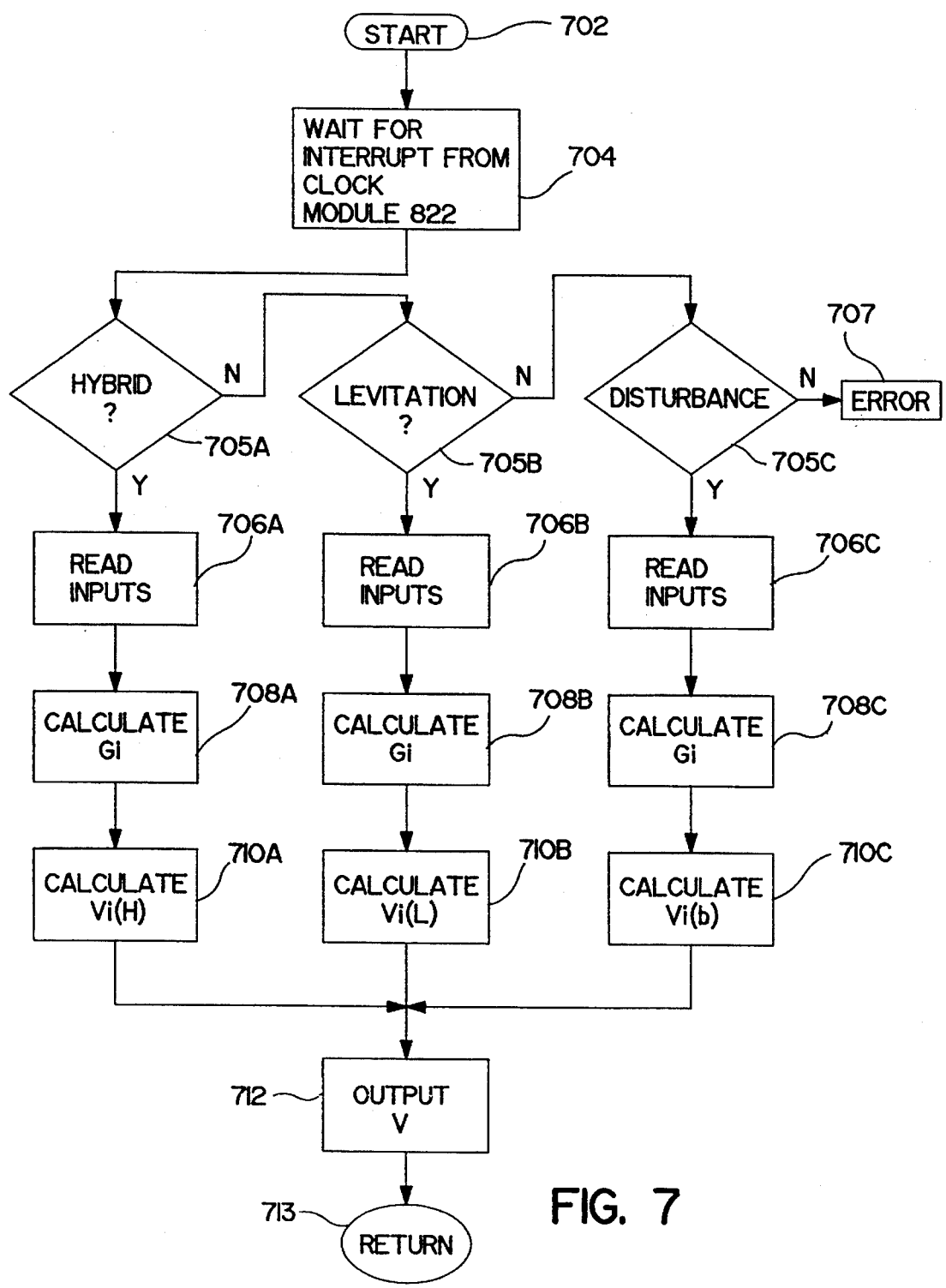
FIG. 7 is a flow chart setting forth the operation of an exemplary control algorithm useful in the context of the present invention.

Returning now to step 706 in FIG. 7, if the interrupt signal is a levitation clock signal (step 705B), processor 406 reads the appropriate input values necessary to implement the levitation control equations discussed supra (step 706B); in a preferred embodiment, respective feedback signals 33 and 43 are read.

The appropriate values of $G_i$ are then calculated (step 708B), and used to calculate the appropriate control signals $V_i$ (step 710B). The control signals are thereafter summed with the disturbance rejection control signal, if appropriate, and applied to the magnetic bearings (step 712).

Again returning to step 704, if the interrupt is not a disturbance rejection interrupt, an appropriate error signal is generated (step 707). If the interrupt is a disturbance rejection clock interrupt (step 705C), the appropriate input values necessary to implement a disturbance rejection sequence are read by processor 406 (step 705C). In the preferred embodiment, input signals 33, the 43, 53A, and 53B (see FIG. 8A) are read (step 706C), appropriate $G_i$ values are calculated (step 708C), and the corresponding control signals $V_i$ are generated (step 710C). The control signals are then summed with levitation signals, if appropriate, and applied to the corresponding bearings (step 712).

Presently known disturbance rejection control algorithms may be conveniently implemented in the context of the present invention. In particular, the control algorithms set forth in Taylor U.S. Pat. No. 4,947,435 issued Aug. 7, 1990 and Chaplin, et al., U.S. Pat. No. 4,490,841 issued Dec. 25, 1984 would be well suited for use in the present invention.

It will be understood that the foregoing description is a preferred exemplary embodiment, and that the invention is not limited to the specific forms shown described herein. Various modifications to the designs, components, and steps discussed herein may be made within the context of the present inventions.

For example, while proportional and proportional-integral-derivative control algorithms were specifically discussed, any suitable control algorithm may be satisfactorily employed in the context of the present invention, including $H^\infty$, Hall placement, root locus, model reference adaptive control, and the generalized minimum variance self-adaptive control algorithm. Moreover, although the preferred embodiment discloses various degrees of integration between the control program for effecting levitation control and the control program for effecting disturbance rejection control, it is understood that any degree of integration between these two schemes may be useful in the context of the present invention, from total integration in which the same sensed values are employed in both levitation and disturbance rejection, on the one hand, to total autonomous implementation of levitation and disturbance rejection, with the respective outputs simply being added together before application to the bearing, thus superimposing the disturbance rejection output onto the levitation output.

In addition, certain physical relationships between flux, voltage, current, and force have been set forth and discussed herein in the context of the levitation control system. It is understood, however, that any suitable equations and physical relationships may be employed to effect the desired control in accordance with the present invention.

Further, a preferred embodiment of the present invention was described using total coil flux and current as feedback parameters. However, the present invention contemplates any number of feedback parameters which would be useful in ascertaining, directly or indirectly, shaft position, shaft speed, shaft acceleration, and any other physical parameter useful in controlling shaft 10.

These and other modifications may be made in the design and implementation of the present invention without departing from the spirit and scope of the present invention, as set forth in the appended claims.

We claim:

1. A control system for use in controlling a magnetically permeable body movably mounted within a plurality of magnetic bearings, each of the magnetic bearings comprising an electromagnet having a coil wound about a magnetically permeable core integral with at least one of the magnetic bearings, wherein each of the magnetic bearings is disposed adjacent and in close proximity to the body, forming a gap intermediate the body and the electromagnet, wherein electric current flowing through the coil generates magnetic flux having a given polarity and magnitude permeating the body through the core and across the gap, comprising:

a first flux sensor for generating indicia of flux resident in said gap; and a controller for sampling said flux indicia and providing at least one control signal to said electromagnet to control the current flowing through said coil and the position of the body based on at least said flux indicia, said controller including a levitation controller for controlling levitation of the body based on at least said flux indicia; and a disturbance rejection controller for effecting disturbance rejection of the body based on at least said flux indicia.

2. The control system of claim 1, wherein said first flux sensor includes:

a first sensor responsive to the magnitude and polarity of the flux resident in the gap; and a second sensor responsive to the rate at which the flux resident in the gap fluctuates as said body moves.

3. The control system of claim 1, wherein the magnetic bearings include first and second electromagnets, and wherein said controller provides a first control signal to the first electromagnet and a second control signal to the second electromagnet.

4. The control system of claim 3, wherein said first control signal is identical in magnitude and phase and opposite in polarity to said second control signal.

5. The control system of claim 3, wherein the first and second electromagnets form first and second gaps intermediate the body and the first and second electromagnets, respectively, and wherein said system further comprises:

a second flux sensor for generating flux indicia corresponding to the flux resident in the first and second gaps, respectively; and wherein said controller provides said first control signal to the first electromagnet based on at least said flux indicia generated by said second sensor.

6. The control system of 5, wherein said controller provides said second signal to the second electromagnet based on at least said flux indicia generated by said first sensor.

7. The control system of claim 1, further comprising a bias circuit for supplying a bias signal to the electromagnet to maintain the body in an approximately null position.

8. The control system of claim 1, wherein said controller periodically samples said flux indicia generated by said flux sensor, and wherein said control system further comprises a clock module for providing clock signals to said controller to control the rate at which said controller samples said flux indicia.

9. The control system of claim 1, wherein said clock module provides said clock signals to said controller so that said controller samples said flux indicia at a constant rate.

10. The control system of claim 8, wherein said clock module includes a variable rate clock for providing said clock signals to said controller so that said controller samples said flux indicia at a rate varying according to the rate of movement of the body.

11. The control system of claim 8, wherein said clock module comprises a variable rate clock for providing said clock signals to said controller so that said controller samples said flux indicia at a constant rate if the rate of movement of the body is at or below a selected threshold rate, and wherein said clock module provides said clock signals to said controller so that said controller samples said flux indicia at a rate corresponding to the rate of movement of the body if the rate of movement of the body exceeds said threshold rate.

12. The control system of claim 1, wherein said levitation controller and said disturbance rejection controller periodically sample said flux indicia generated by said flux sensor, and wherein said control system further comprises a clock module, including:

a levitation clock for providing a levitation clock signal to said levitation controller to control the rate at which said levitation controller samples said flux indicia; and a disturbance rejection clock for providing a disturbance rejection clock signal to said disturbance rejection controller to control the rate at which said disturbance rejection controller samples said flux indicia.

13. The control system of claim 12, wherein at least one of said clocks provides said clock signals to at least one of said controllers such that said controller samples said flux indicia at a constant rate.

14. The control system of claim 12, wherein said levitation clock and said disturbance rejection clock provide signals to said levitation controller and said disturbance rejection controller such that said levitation controller and said disturbance rejection controller sample said flux indicia at a rate varying according to the rate of movement of said body.

15. The control system of claim 12, wherein:

said levitation clock comprises a variable rate clock for providing said clock signals to said levitation controller so that said levitation controller samples said flux indicia at a constant rate if the rate of movement of the body is at or below a threshold rate, and at a rate corresponding to the rate of movement of the body if the rate of movement of the body exceeds said threshold rate; and said disturbance rejection clock comprises a variable rate clock for providing said clock signals to said disturbance rejection controller so that said disturbance rejection controller samples said flux indicia at a constant rate if the rate of movement of the body is at or below a threshold rate, and at a rate corresponding to the rate of movement of the body if the rate of movement of the body exceeds said threshold rate.

16. The control system of claim 12, wherein at least one of said clocks provides one of said clock signals such that one of said controllers samples said flux indicia at a constant rate, and wherein the other of said clocks provides the other of said clock signals such that the other of said controllers samples said flux indicia at a rate corresponding to the movement rate of the body.

17. The control system of claim 1, wherein said controller is further responsive to the current in the coil, and wherein said controller provides control signals to the electromagnet to control the position of the body further based on at least the current in the coil.

18. The control system of claim 1, further comprising:

a speed sensor responsive to the movement speed of the body; and a position sensor responsive to the position of said body;

wherein said disturbance rejection controller effects disturbance rejection of the body further based on at least the speed and position of the body.

19. The control system of claim 1, wherein said controller determines a magnitude of the gap based on at least said flux indicia, and provides at least one of said control signals to the electromagnet according to a linear relationship with said magnitude of the gap, and wherein said control signal V is characterized by the equation $$V = KG'$$

where K is a constant, and G' corresponds to the magnitude of said gap.

20. The control system of claim 1, wherein said controller determines a magnitude of the gap based at least on said flux indicia, and provides at least one of said control signals to the electromagnet according to a proportional-integral-derivative relationship with said magnitude of the gap.

21. The control system of claim 19, wherein said control signal V is characterized by the equation:

$$V = K_P G'(t_0) + K_I \left( \sum_0^\infty G'(t_n) \right) + K_D(G'(t_0) - G'(t_{-1}))$$

where $K_P$ is a proportional coefficient, $K_I$ is an integral coefficient, $K_D$ is a derivative coefficient, $G'(t_0)$ corresponds to the current magnitude of the gap, and $G'(t_{-1})$ corresponds to an earlier magnitude of the gap.

22. The control system of claim 1, wherein said controller determines the magnitude of the gap based at least on said flux indicia, and provides at least one of said control signals to the electromagnet according to a proportional-derivative relationship with said magnitude of the gap.

23. The control system of claim 1, wherein said disturbance rejection controller receives indicia of harmonic disturbances from said flux sensor, inverts said harmonic disturbance indicia, and provides said inverted harmonic disturbance indicia to said electromagnet.

24. The control system of claim 23, wherein said controller processes said harmonic disturbance indicia according to an antinoise algorithm.

25. The control system of claim 7, further comprising an amplifier connected to said controller and said bias circuit for amplifying and mixing said control signals and said bias signal, and providing said mixed and amplified signals to the coil.

26. The control system of claim 25, wherein said amplifier further amplifies and mixes said control signal, said bias signal, and a feedback flux signal, and provides said mixed and amplified signals to the coil.

27. The control system of claim 26, wherein said amplifier includes a subtractor for subtracting the bias signal from said feedback flux signal so that said feedback flux signal is based only on flux generated by said control signal and not on said bias signal.

28. A method of controlling a magnetic bearing supporting a magnetically permeable rotating shaft wherein the magnetic bearing includes an electromagnet having a coil wound about a core disposed adjacent and in close proximity to the shaft to form a gap between the electromagnet and the shaft, wherein current flowing in the coil generates magnetic flux permeating the core and the shaft across the gap, comprising the steps of:

sensing the flux resident in the gap;

providing a control signal to the electromagnet to control the current flowing in the coil based on at least the sensed flux, comprising the steps of:

providing a levitation control signal to the electromagnet to control levitation of the shaft based on at least the sensed flux; and providing a disturbance rejection control signal to the electromagnet for effecting disturbance rejection of the shaft based on at least the sensed flux.

29. The method of claim 28, wherein the step of sensing the flux resident in the gap includes the steps of:

sensing the magnitude and polarity of the flux resident in the gap; and sensing the rate at which the flux resident in the gap fluctuates.

30. The method of claim 28, wherein the magnetic bearing includes first and second electromagnets, and wherein the step of providing a control signal to the electromagnet includes the steps of:

providing a first control signal to the first electromagnet; and providing a second control signal to the second electromagnet, wherein said second control signal is identical in magnitude and phase and opposite in polarity to said first control signal.

31. The method of claim 28, further comprising the step of providing a bias signal to the electromagnet to maintain the body in an approximately null position.

32. The method of claim 28, wherein the step of sensing the flux resident in the gap includes sampling the flux at a constant rate.

33. The method of claim 28, wherein the step of sensing the flux resident in the gap includes sampling the flux at a rate corresponding to the rotation rate of the shaft.

34. The method of claim 28, wherein the step of sensing the flux resident in the gap includes the steps of:

determining the rotation rate of the shaft;

sampling the flux at a constant rate if the rotation rate of the shaft is at or below a preselected threshold rate; and sampling the flux at a rate corresponding to the rotation rate of the shaft if the rotation rate of the shaft exceeds said threshold rate.

35. The method of claim 28, further comprising the step of modifying said control signal to the electromagnet to control the current flowing in the coil based on at least the current in the coil.

36. The method of claim 28, further comprising the steps of:

determining the rotation speed of the shaft;

determining the position of the shaft; and providing said disturbance rejection control signal to the electromagnet for effecting disturbance rejection of the shaft based on at least the sensed flux, the rotation speed of the shaft, and the position of the shaft.

37. The method of claim 28, further comprising the step of:

determining a magnitude of the gap based on at least said sensed flux; and wherein the step of providing said control signal to the electromagnet includes providing said control signal according to a linear relationship with said magnitude of the gap, wherein said control signal V is characterized by the equation:

$$V = KG'$$

where K is a constant, and G' corresponds to the magnitude of the gap.

38. The method of claim 28, further comprising the step of:

determining a magnitude of the gap based on at least said sensed flux; and wherein the step of providing said control signal to the electromagnet includes providing said control signal according to a proportional-integral-derivative relationship with said magnitude of the gap.

39. The method of claim 38, wherein said control signal V is characterized by the equation:

$$V = K_P G'(t_0) + K_I \left( \sum_{0}^{\infty} G'(t_n) \right) + K_D (G'(t_0) - G'(t_{-1}))$$

where $K_P$ is a proportional coefficient, $K_I$ is an integral coefficient, $K_D$ is a derivative coefficient, G' is the gap magnitude, $G'(t_0)$ corresponds to the current magnitude of the gap, and $G'(t_{-1})$ corresponds to a preceding magnitude of the gap.

* * * * *